United States Patent [19]

Schulze

[11] 4,053,445

[45] Oct. 11, 1977

[54] SOLUTIONS OF ETHYLENE-CHLOROTRIFLUOROETHYLENE COPOLYMERS

[75] Inventor: Stephen R. Schulze, Gillette, N.J.

[73] Assignee: Allied Chemical Corporation, Morris Township, N.J.

[21] Appl. No.: 737,231

[22] Filed: Nov. 1, 1976

[51] Int. Cl.$^2$ .................... C08K 5/02; C08K 5/10; C08K 5/15; C08K 5/20
[52] U.S. Cl. .................... 260/31.2 R; 260/30.2; 260/31.8 F; 260/32.4; 260/32.6 R; 260/32.8 R; 260/33.2 R; 260/33.8 F; 526/249
[58] Field of Search ............ 260/30.2, 31.2 R, 31.8 F, 260/32.4, 32.6 R, 32.8 R, 33.2 R, 33.8 F; 526/249

[56] References Cited

U.S. PATENT DOCUMENTS

| 2,392,378 | 1/1946 | Hanford | 526/249 |
|---|---|---|---|
| 2,581,453 | 2/1952 | Sprung | 260/31.8 F |
| 2,686,770 | 8/1954 | Dipner | 260/31.8 F |
| 2,732,357 | 1/1956 | Sprung | 260/31.8 F |
| 2,775,569 | 12/1956 | Dipner et al. | 260/31.8 F |
| 2,844,555 | 7/1958 | Passino et al. | 260/33.8 F |
| 2,851,462 | 9/1958 | Fuchs et al. | 260/33.8 F |
| 2,915,509 | 12/1959 | Honn et al. | 260/33.8 F |
| 3,371,076 | 2/1968 | Ragazzini et al. | 526/249 |
| 3,501,446 | 3/1970 | Ragazzini et al. | 526/249 |
| 3,745,145 | 7/1973 | Khattab et al. | 260/45.75 XA |
| 3,773,698 | 11/1973 | Khattab | 260/23 XA |
| 3,859,262 | 1/1975 | Hartwimmer | 526/249 |
| 3,947,525 | 3/1976 | Robertson et al. | 260/878 R |

FOREIGN PATENT DOCUMENTS 949,422   2/1964   United Kingdom

OTHER PUBLICATIONS

Ragazzini et al., European Polymer J., 3, 129–136 (1967).
Garbuglio et al., European Polymer J., 3, 137–144 (1967).

Primary Examiner—Donald E. Czaja
Assistant Examiner—H. H. Fletcher
Attorney, Agent, or Firm—Roger H. Criss; Jay P. Friedenson

[57] ABSTRACT

Solutions of a copolymer of about 55 to 95 mol percent chlorotrifluoroethylene and about 45 to 5 mol percent ethylene in an organic solvent. The solutions may optionally contain an organic silane, preferably an aminosilane.

10 Claims, No Drawings

4,053,445

SOLUTIONS OF ETHYLENE-CHLOROTRIFLUOROETHYLENE COPOLYMERS

BACKGROUND OF THE INVENTION

1. Field of the Invention

This invention relates to copolymers of ethylene-chlorotrifluoroethylene and to solutions thereof.

2. Discussion of the Prior Art

Copolymers of ethylene and chlorotrifluoroethylene (CTFE) are known in the art. Copolymers (sometimes referred to as ECTFE copolymers) of ethylene and chlorotrifluoroethylene containing beween about 40 to 60 mol percent of ethylene units and correspondingly about 60 to 40 mol percent of chlorotrifluoroethylene units are disclosed, for example, in U.S. Pat. Nos. 3,947,525 to Robertson et al., 3,773,698 to Khattab and 3,745,145 to Khattab et al. ECTFE copolymers are also disclosed, for example, in U.S. Pat. No. 2,392,378 to Hanford, U.S. Pat. Nos. 3,371,076 and 3,501,446 to Ragazzini et al., British Patent No. 949,422, in European Polymer Journal, 1967, volume 3, pp. 129–144 and in Nucleonics, September 1964, pp. 72–74. ECTFE copolymers exhibit outstanding mechanical, electrical and chemical properties at high temperatures. For example, about equimolar ECTFE copolymers resist attack of most organic solvents at ambient as well as elevated temperatures, being only slightly soluble at 100° to 150° C in 2,5-dichlorobenzotrifluoride/benzonitrile or o-dichlorobenzene mixtures of 10:90 to 50:50 volume ratio. They are also insoluble in bases and acids, including fuming nitric acid and possess high tensile strength and have melting points above about 200° C. Such copolymers are suitable for making such useful articles as valves, gaskets, pipes, wire insulation, sheets and films.

Up to the present, however, such copolymers, being insoluble in the usual solvents, have been available only in powder or pellet form so that their utilization requires a thermal treatment of some kind in order to melt the copolymer. It would be desirable if there were provided ECTFE copolymers which were soluble in common solvents as well as solutions of such copolymers.

SUMMARY OF THE INVENTION

In accordance with this invention, there is provided a solution of a copolymer of about 55 to 95 mol percent chlorotrifluoroethylene and about 5 to 45 mol percent of ethylene dissolved in an organic solvent. It has been unexpectedly discovered that ECTFE copolymers having CTFE contents between about 55 and 95 mol percent, preferably between about 58 and 90 mol percent, and most preferably between about 60 to 80 mol percent, are soluble in common organic solvents. As such, the copolymers may be deposited by coating or by other non-melting processes onto various substrates to provide articles having adherent layers of ECTFE copolymers. The resulting copolymer layers have excellent clarity and also exhibit desirable mechanical, electrical and chemical properties.

In accordance with another aspect of this invention, it has been unexpectantly discovered that when organic silanes are added to the above solutions of ECTFE copolymers, excellant adherency is provided between the coated ECTFE layer and the substrate.

DESCRIPTION OF THE PREFERRED EMBODIMENTS

The ECTFE copolymers of this invention comprise about 55 to 95 mol percent of CTFE and correspondingly about 45 to 5 mol percent ethylene. These copolymers are high molecular weight normally solid polymers which have melting points of about 100° to 210° C. Preferably, the copolymers comprise about 58 to 90 mol percent CTFE and about 42 to 10 mol percent ethylene. Most preferably, the copolymers comprise about 60 to 80 mol percent CTFE and about 40 to 20 mol percent ethylene.

These copolymers may be prepared in accordance with conventional procedures for preparing ECTFE copolymers, such as those described in the aforementioned patents and articles. Of course, ethylene and CTFE feeds are to be adjusted to provide the desired proportions of molar units in the copolymer. The copolymers may be prepared, for example, by charging liquid CTFE monomer into a reaction vessel to which a suitable initiator is added, e.g., organic peroxide such as trichloroacetyl peroxide. Ethylene in gaseous form is fed into the reactor in desired flow rates and amounts. Small amounts of chain transfer agents such as chloroform or heptane may be added. Alternatively, the copolymerization may be conducted in a stirred aqueous medium. Such reactions may typically be conducted at temperatures ranging from about −80° to +80° C, preferably from about 0° to 70° C and most preferably from about 40° to 60° C, and under superatmospheric pressures.

It has been found that the aforementioned ECTFE copolymers are soluble in common organic solvents at room temperature and higher temperatures. Examples of such organic solvents include the chlorinated hydrocarbons such as chloroform, methylene chloride, ethylene chloride, 1,1,2-trichloroethane, 1-chlorobutane, dichlorobutane, trichloroethylene, perchloroethylene and the like; ketones such as methyl ethyl ketone, methyl isobutyl ketone, methylisoamyl ketone, di-isobutyl ketone, acetophenone, cyclohexanone and the like; esters such as ethyl acetate, isopropyl acetate, n-butyl acetate, isobutyl acetate, isoamyl acetate, vinyl acetate, isobutyl isobutyrate, propylene carbonate, ethylene carbonate, dioctyl phthalate, dibutyl phthalate and the like; ethers such as diethyl ether, furan, tetrahydrofuran, dioxane, 2,2-dichlorodiethylether and the like; aldehydes such as benzaldehyde and the like; nitrogen-containing compounds such as acetonitrile, butyronitrile, nitromethane, nitroethane, formamide, dimethyl formamide, aniline, ethanol amine, pyridine, N-methyl-2-pyrrolidone, dimethylacetamide and the like; etc. and mixtures thereof. Preferably, the solvent is a mixture of a chlorinated hydrocarbon and a ketone or ester.

Especially preferred organic solvents include perchloroethylene, methyl ethyl ketone, methyl isobutyl ketone, chlorobenzene, vinyl acetate, chloroform, trichloroethylene and mixtures thereof. Preferred mixtures are mixtures of perchloroethylene or chlorobenzene together with methyl ethyl ketone or methyl isobutyl ketone, as well as mixtures of perchloroethylene and vinyl acetate. The solutions may typically contain from about 0.1 to 40 weight percent solids, and preferably from about 1 to 25 weight percent solids.

The fact that the copolymers containing CTFE in an amounts of about 55 mol percent and above are soluble in such organic solvents is truly surprising since it has been previously known that about equimolar copolymers of ECTFE are not soluble in common solvents. Moreover, it has been discovered that copolymers of ECTFE containing 53 mol percent CTFE are also not soluble in the organic solvents.

The copolymer solutions of this invention are useful to provide coated articles having the excellent resistance of the ECTFE copolymer. Any suitable substrate may be employed such as, for example, metal such as steel, aluminum, chromium, tin, etc., glass fabrics, thermosetting and thermoplastic resins such as nylon and the like. It has been found that solutions of this invention are particularly suitable to provide clear, tough, corrosion resistant coatings to chromium plated metals and plastics, such as those employed in automotive exterior and interior trim strips and interior decorative parts. The coated articles possess outstanding mechanical, electrical and chemical properties as is known for ECTFE copolymers as well as excellent weatherability. The solutions may be coated onto the substrate by any suitable procedure.

In accordance with another aspect of this invention, it has been discovered that the presence of organic silane compounds, such as those commonly employed as coupling agents, in the solutions in minor amounts unexpectedly improves the adhesion of the ECTFE to the substrate. The organic silanes useful in this invention have the general formula $R(CH_2)_2—Si(X_3)$, wherein X is a hydrolyzable group such as $OCH_3$ and $OC_2H_4OCH_3$, R is a functional organic radical such as amino, vinyl, cyclic epoxy, aliphatic epoxy, methacryloxy and mercapto, and $n$ is 0 to 10. Suitable silanes include N-beta-(aminoethyl)gamma-aminopropyltrimethoxysilane, gamma-aminopropyltriethoxysilane, vinyltriethoxysilane, vinyl-tris-(beta-methoxyethoxy)-silane, beta-(3,4-epoxycyclohexyl) ethyltrimethoxysilane, gamma-glycidoxypropyltrimethoxysilane, gamma-mercaptopropyltrimethoxysilane and the like. Preferred are the aminosilanes. The organic silanes are preferably present in amounts of about 0.1 to 10 weight percent based upon the weight of the copolymer, and more preferably about 0.2 to 5 weight percent.

The following non-limiting examples are given to further illustrate the invention. All parts and percentages are by weight unless otherwise indicated.

EXAMPLE 1

A 40 gallon glass-lined reactor was purged with nitrogen to remove the air and the nitrogen was evacuated. There were charged to the reactor 22.5 gallons of deionized water, 25 pounds of CTFE and the reactor was pressurized to 180 psig with ethylene (0.65 pounds). The reactor was heated to 45° C and 70 g of t-butylperoxypivalate in 2 liters of 1,1,2-trichloro-1,2,2-trifluoroethane were added as catalyst. With ethylene being continuously fed, the pressure was gradually reduced to 150 psig at the end of the run which lasted 6 hours and 15 minutes. The temperature was increased after 1.5 hours to 50° C. At the conclusion of the run, 2.55 pounds of ethylene had been fed (in addition to the 0.65 initial pounds). During the reaction, the reaction mixture was continuously stirred with a mechanical agitator at 230 rpm. About 20 pounds of the copolymer was recovered which was identified by carbon-hydrogen analysis to contain 57.9 mol percent of CTFE and 42.1 mol percent of ethylene. The copolymer had a softening point of about 170° to 180° C.

The copolymer was soluble at temperatures as low as 40° C. in a 50:50 (volume) mixture of perchloroethylene and methyl ethyl ketone. Solubility was determined by charging one gram of the copolymer into 20 cc of solvent and heating to the boiling point of the solvent while stirring. When the copolymer dissolved, the temperature was gradually reduced to determine the temperature at which the material gelled.

EXAMPLE 2

Example 1 was repeated at a reaction temperature of 60° C. Ethylene gas was charged to a total pressure of 239 psig. The catalyst was mixed with 0.5 gallons of methanol. The reaction was continued for 19 hours with continuous ethylene feed (1.5 lbs) to maintain the reaction pressure. There were recovered 12 pounds of a copolymer containing 69.7 mol percent CTFE and 30.3 mol percent ethylene. The copolymer, having a softening point of 100° to 110° C, was soluble at room temperature in a 50:50 (volume) mixture of perchloroethylene and methyl ethyl ketone.

The copolymer product of Example 1 was also soluble at 50° C. and higher in 50/50 (volume) mixtures of perchloroethylene and methylisobutyl ketone, chlorobenzene/methyl ethyl ketone and perchloroethylene/vinyl acetate. The copolymer product of Example 2 was also soluble in such mixed solvents as well as in chloroform at temperatures as low as room temperature.

EXAMPLE 3 (Comparative)

Example 2 was repeated except that the temperature was 20° C, the catalyst was trichloroacetyl peroxide dissolved in 1,1,2-trichloro-1,2,2-trifluoroethane (0.5 g was added every 10 minutes) and the total pressure was 155 psig. The copolymer contained 53 mol percent CTFE and 47 mol percent ethylene. The copolymer was not soluble in a 50/50 (volume) mixture of perchloroethylene/methyl ethyl ketone at temperatures up to the boiling point.

EXAMPLE 4 (Comparative)

Example 3 was repeated except that the temperature was 10° C and the total pressure was 175 psig. The copolymer was an equimolar copolymer of ECTFE. Such copolymer likewise was insoluble in the mixed solvent at temperatures up to the boiling point.

EXAMPLE 5

A 4 weight percent solution of the copolymer of Example 1 in a 50/50 (volume) solution of a perchloroethylene/methyl ethyl ketone was coated onto a 22 mil thick carbon steel plaque which had been plated with 0.5 mil copper, 1 mil nickel and 0.01 mil chromium. The plaque measured about 8 by 8 inches and an area of about 12 square inches was coated. The solvent was then driven off by heating at 50° C. for 1 hour. The resulting coating of ECTFE copolymer had a thickness of about 1 mil. The plaque was exposed on a roof top for a period of about 3 months. The plaque then examined and it was observed that in the areas which were uncoated, rust had penetrated through the chrome layer and the plaque had turned a brown color. In the area which was covered with the ECTFE copolymer, the chrome layer was protected and retained its original brightness and the copolymer retained its original clarity.

EXAMPLE 6

The copolymer of Example 1 was dissolved in an amount of 150 grams into 3 liters of an equal volume mixture of perchloroethylene and methyl ethyl ketone. The solvent was boiled at about 80° C. until all the copolymer was dissolved and then cooled to about 60° C. Five weight percent, based on the weight of the copolymer, of an organic silane, N-beta-(amino)gamma-aminopropyltrimethoxysilane, was added to 20 ml of the copolymer solution and a small amount was coated onto metal plaques. The plaques were air-dried for 20 minutes and thereafter oven dried at 80° C. for about 15 minutes.

The adhesion of the solution onto aluminum and chromium plated steel plaques was excellent and the coating was clear. The coating could not be peeled off with a knife. Solutions of 1 percent of the amino silane based on the weight of the copolymer also provided excellent coatings on the plaques whereas a 0.5 percent solution provided fairly good adhesion. In comparison, when the amino silane was omitted, the adhesion to the aluminum and chromium plated plaques was poor.

Various conventional additives may be incorporates into the solutions of this invention. For example, the stabilizing systems of the aforementioned Khattab and Khattab et al. patents may be utilized. The disclosures of such patents are expressly incorporated herein. In addition, other conventional additives may be employed, such as pigments, reinforcing agents, fillers, thixotropic agents, thickeners and the like.

It is to be understood that variations and modifications of the present invention may be made without departing from the scope of the invention. It is also to be understood that the scope of the invention is not to be interpreted or limited to the specific embodiment disclosed herein, but only in accordance with the appended claims when read in light of the foregoing disclosure.

I claim:

1. A solution comprising a copolymer of about 55 to 95 mol percent chlorotrifluoroethylene and about 45 to 5 mol percent ethylene dissolved in an organic solvent.

2. The solution of claim 1 wherein said copolymer comprises from about 58 to 90 mol percent chlorotrifluoroethylene and about 42 to 10 mol percent ethylene.

3. The solution of claim 2 wherein said copolymer comprises from about 60 to 80 mol percent chlorotrifluoroethylene and about 40 to 20 mol percent ethylene.

4. The solution of claim 3 wherein said organic solvent is selected from the group consisting of perchloroethylene, methyl ethyl ketone, methyl isobutyl ketone, chlorobenzene, vinyl acetate, chloroform and mixtures thereof.

5. The solution of claim 1 wherein said organic solvent is selected from the group consisting of chlorinated hydrocarbons, ketones, esters, ethers, aldehydes, nitrogen-containing compounds and mixtures thereof.

6. The solution of claim 1 wherein said copolymer is present in said solvent in a concentration of about 0.1 to 40 weight percent.

7. The solution of claim 1 additionally comprising an organic silane compound having the general formula $R(CH_2)_n-SI(X_3)$, wherein X is a hydrolyzable group selected from $OCH_3$ and $OC_2H_4OCH_3$, R is a functional organic radical selected from amino, vinyl, cyclic epoxy, aliphatic epoxy, methacryloxy and mercapto, and $n$ is 0 to 10.

8. The solution of claim 7 comprising from about 0.1 to 10 weight percent of said silane based on the weight of said copolymer.

9. The solution of claim 7 wherein said silane is an amino silane.

10. The solution of claim 9 wherein said copolymer comprises from about 58 to 90 mol percent chlorotrifluoroethylene and about 42 to 10 mol percent ethylene.

* * * * *